US010505829B2

(12) United States Patent
Dudda et al.

(10) Patent No.: US 10,505,829 B2
(45) Date of Patent: *Dec. 10, 2019

(54) PDCP AND FLOW CONTROL FOR SPLIT BEARER

(71) Applicant: TELEFONAKTIEBOLAGET L M ERICSSON (PUBL), Stockholm (SE)

(72) Inventors: Torsten Dudda, Aachen (DE); Riika Susitaival, Helsinki (FI); Alexander Vesely, Feldbach (AT); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,007

(22) Filed: Nov. 2, 2017

(65) Prior Publication Data

US 2018/0123920 A1 May 3, 2018

Related U.S. Application Data

(63) Continuation of application No. 14/697,060, filed on Apr. 27, 2015, now Pat. No. 9,838,282.

(Continued)

(51) Int. Cl.
*H04L 12/26* (2006.01)
*H04L 1/16* (2006.01)
(Continued)

(52) U.S. Cl.
CPC .............. *H04L 43/062* (2013.01); *H04L 1/16* (2013.01); *H04L 1/1642* (2013.01);
(Continued)

(58) Field of Classification Search
CPC .. H04W 36/02; H04W 36/023; H04W 84/047
See application file for complete search history.

(56) References Cited

U.S. PATENT DOCUMENTS 8,837,310 B2 * 9/2014 Wang ........................ H04J 3/06
  370/252
9,001,781 B2 * 4/2015 Ahluwalia ............ H04W 36/02
  370/331

(Continued)

FOREIGN PATENT DOCUMENTS

RU  2392752 C2  1/2007
RU  2392752 C2  6/2010
RU  2434337 C1  11/2011

OTHER PUBLICATIONS

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 11). 3GPP Standard; 3GPP TR 36.842, 3rdGeneration Partnership Project (3GPP), Mobile Competence Centre . 650, Route Des Lucioles . F-06921 Sophia-Antipolis Cedex . France, vol. RAN WG2, No. V0.3.0. Aug. 23, 2013 (Aug. 23, 2013).

(Continued)

*Primary Examiner* — Chandrahas B Patel
(74) *Attorney, Agent, or Firm* — Baker Botts, LLP

(57) ABSTRACT

A method in a network node is disclosed. The method comprises sending one or more packet data convergence protocol (PDCP) packet data units (PDUs) to a second network node on an internode interface, each of the one or more PDUs having an associated PDCP sequence number and an associated internode interface specific sequence number, the internode interface specific sequence numbers assigned by the network node. The method further comprises receiving feedback from the second network node.

32 Claims, 9 Drawing Sheets

Related U.S. Application Data

(60) Provisional application No. 61/990,944, filed on May 9, 2014.

(51) Int. Cl.

| | | |
|---|---|---|
| *H04L 1/18* | (2006.01) | |
| *H04L 12/801* | (2013.01) | |
| *H04L 12/825* | (2013.01) | |
| *H04L 12/807* | (2013.01) | |
| *H04W 36/02* | (2009.01) | |
| *H04L 1/00* | (2006.01) | |
| *H04W 36/00* | (2009.01) | |

(52) U.S. Cl.
CPC ........ *H04L 1/1841* (2013.01); *H04L 43/0829* (2013.01); *H04L 43/0888* (2013.01); *H04L 47/14* (2013.01); *H04L 47/263* (2013.01); *H04L 47/27* (2013.01); *H04W 36/023* (2013.01); *H04L 2001/0092* (2013.01); *H04W 36/0069* (2018.08)

(56) References Cited

U.S. PATENT DOCUMENTS

| | | |
|---|---|---|
| 2010/0067483 A1 | 3/2010 | Ahluwalia |
| 2013/0121171 A1 | 5/2013 | Wang et al. |

OTHER PUBLICATIONS

3rd Generation Partnership Project; Technical Specification Group Radio Access Network; Radio Link Control (RLC) protocol specification (Release 11). 3GPP Draft; 25322-B20, 3rd Generation Partnership Project (3GPP), Mobile Competence Centre ; 650, Route Des Lucioles ; F-06921 Sophia-Antipolis Cedex; France Mar. 15, 2013 (Mar. 15, 2013).

Fujitsu. Discussion on master-slave RLCs. 3GPP Draft; r2-133208 Discussion on Master-Slave RLCS, 3rd Generation Partnership Project (3GPP), Mobile Competence Centre ; 650, Route Des Lucioles ; F-06921 Sophia-Antipolis Cedex; France vol. RAN WG2, No. Ljubljana, Slovenia; Oct. 7, 2013-Oct. 11, 2013. Sep. 27, 2013 (Sep. 27, 2013).

Texas Instruments. ARQ Windows, Timers, and Reordering for RLC. 3GPP Draft; R2-075072 Windows Timers Reordering in RLC TI, 3rd Generation Partnership Project T3GPP), Mobile Competence Centre; 650 Route Des Lucioles ; F-06921 Sophia Antipolis Cedex ; France, vol. RAN WG2, No. Jeju, Korea; Nov. 5, 2007-Nov. 9, 2007, Nov. 12, 2007 (Nov. 12, 2007).

3rd Generation Partnership Project; Technical Specification Group Radio Access Network; Evolved Universal Terrestrial Radio Access (E-UTRA); Packet Data Convergence Protocol (PDCP) Specification (Release 11). 3GPP TS 36.323 V11.2.0 (Mar. 2013).

\* cited by examiner

PDCP AND FLOW CONTROL FOR SPLIT BEARER

TECHNICAL FIELD

The present disclosure relates, in general, to wireless communications and, more particularly, to providing feedback between network nodes in a wireless communications network.

BACKGROUND

Dual connectivity is one of the features being standardized within the umbrella work of small cell enhancements within 3GPP Rel-12. Dual connectivity is a feature that allows a user equipment (UE) to simultaneously receive and transmit to at least two different network points. The two different network points are usually denoted as master eNodeB (MeNB) and secondary eNodeB (SeNB). MeNBs serve a master cell group (MCG), and SeNBs serve a secondary cell group (SCG). It is assumed that the radio resource control (RRC) protocol, which is responsible for configuring the UE, is terminated within the MeNB. While the UE receives RRC control signaling via the MCG, it may receive user data via both MCG and SCG.

FIG. 1 is a block diagram of a protocol architecture in dual connectivity. The currently envisaged protocol architecture for Rel-12 supports three types of radio bearers within a MeNB 10 and a SeNB 20. The three types of radio bearers are MCG bearer 30, SCG bearer 40, and split bearer over MCG and SCG 50. MCG bearer 30 includes packet data convergence protocol (PDCP) 32 and radio link control (RLC) 34. SCG bearer 40 includes PDCP 42 and RLC 44. Split bearer 50 includes PDCP 52, RLC 54 and RLC 56. In the case of the split bearer 50, user data that is received by PDCP 52 is split via both RLC 54 of MeNB 10 and RLC 56 of SeNB 20. It is envisaged that some PDCP packet data units (PDUs) may be transmitted to the MeNB RLC 54 and some may be transmitted to the SeNB RLC 56. Due to the transmission delay of the backhaul link between MeNB 10 and SeNB 20, and different radio link conditions between MeNB 10 and the UE and SeNB 20 and the UE, the receiving PDCP protocol entity receives PDUs out of order. To provide in-order delivery to higher layers, PDCP needs to buffer received PDUs and reorder them, based on a reordering window and by using a reordering timer. A typical reordering window has the size of half the sequence number space.

Feedback between MeNB 10 and SeNB 20 may be required for the split bearer operation in dual connectivity to balance the dataflow between MeNB 10 and SeNB 20. The feedback allows MeNB 10 to determine how much data it needs to send to SeNB 20 so that the SeNB transmitter queue is neither underutilized nor overloaded. Furthermore, feedback for the PDCP transmitting entity in MeNB 10 from SeNB 20 to MeNB 10 is necessary to make sure that for split bearers, MeNB 10 does not bring more than half of the PDCP sequence number space in flight. A PDCP receiver based on a reordering window of half the sequence number space is not able to correctly handle more data in flight than half the sequence number space. If MeNB 10 brings more than half the PDCP sequence number space in flight, problems such as hyper frame number (HFN) de-sync may occur. There is a need for a feedback mechanism that fulfills both these requirements and allows MeNB 10 to determine how much of PDCP SN space is currently in flight in order to advance the transmission window.

SUMMARY

To address the foregoing problems with existing solutions, disclosed is a method in a network node. The method comprises sending one or more packet data convergence protocol (PDCP) packet data units (PDUs) to a second network node on an internode interface, each of the one or more PDUs having an associated PDCP sequence number and an associated internode interface specific sequence number, the internode interface specific sequence numbers assigned by the network node. The method further comprises receiving feedback from the second network node, the feedback from the second node comprising: a highest PDCP sequence number of a PDCP PDU that was successfully delivered in sequence to a user equipment among the one or more PDCP PDUs sent to the second network node; a desired additional amount of data in bytes, the desired additional amount of data in bytes counted from the highest PDCP sequence number of the PDCP PDU that was successfully delivered in sequence to the user equipment; and a list of any internode interface specific sequence numbers of PDCP PDUs sent to the second network node that were declared as being lost at the second network node and not yet reported to the network node as being lost.

In certain embodiments, the network node may be a master eNodeB operating on a dual connectivity split bearer, and the second network node may be a secondary eNodeB operating on the dual connectivity split bearer. The internode interface may be an X2 interface. The internode interface specific sequence numbers assigned by the network node may be consecutive. The method may further comprise sending one or more PDCP PDUs to the user equipment, and receiving, from a radio link control in the network node, a notification of successfully delivered PDCP PDUs. The method may further comprise removing one or more buffered PDCP PDUs based at least in part on the received feedback.

In certain embodiments, the method may further comprise controlling, based at least in part on the received feedback, a data flow between the network node and the second network node such that an amount of data in flight is not more than half of a PDCP sequence number space. The amount of data in flight may comprise an amount of data currently on the internode interface and an amount of unacknowledged data in a buffer of the second network node. The method may further comprise adjusting a transmission window based at least in part on the received feedback. The method may further comprise determining, based at least in part on the received feedback, whether a reordering timer in the user equipment is running, and advancing a PDCP transmission window beyond a lost PDCP PDU upon a determination that the reordering timer in the user equipment has expired.

Also disclosed is a network node. The network node comprises one or more processors. The one or more processors are configured to send one or more packet data convergence protocol (PDCP) packet data units (PDUs) to a second network node on an internode interface, each of the one or more PDUs having an associated PDCP sequence number and an associated internode interface specific sequence number, the internode interface specific sequence numbers assigned by the network node. The one or more processors are configured to receive feedback from the second network node, the feedback from the second node comprising: a highest PDCP sequence number of a PDCP PDU that was successfully delivered in sequence to a user equipment among the one or more PDCP PDUs sent to the second network node; a desired additional amount of data in bytes, the desired additional amount of data in bytes counted from the highest PDCP sequence number of the PDCP PDU that was successfully delivered in sequence to the user equipment; and a list of any internode interface specific sequence numbers of PDCP PDUs sent to the second network node that were declared as being lost at the second network node and not yet reported to the network node as being lost.

Also disclosed is a method in a network node. The method comprises receiving, from a second network node, one or more packet data convergence protocol (PDCP) packet data units (PDUs) on an internode interface, each of the one or more PDCP PDUs having an associated PDCP sequence number and an associated internode interface specific sequence number, the internode interface specific sequence numbers assigned by the second network node, and transmitting one or more of the received one or more PDCP PDUs to a user equipment. The method further comprises reporting feedback to the second network node, the feedback reported to the second network node comprising: a highest PDCP sequence number of a PDCP PDU that was successfully delivered in sequence to the user equipment among the one or more PDCP PDUs received from the second network node; a desired additional amount of data in bytes, the desired additional amount of data in bytes counted from the highest PDCP sequence number of the PDCP PDU that was successfully delivered in sequence to the user equipment; and a list of any internode interface specific sequence numbers of PDCP PDUs declared as being lost at the network node and not yet reported to the second network node as being lost.

In certain embodiments, the network node may be a secondary eNodeB operating on a dual connectivity split bearer, and the second network node may be a master eNodeB operating on the dual connectivity split bearer. The internode interface may be an X2 interface. The internode interface specific sequence numbers assigned by the second network node may be consecutive.

In certain embodiments, the method further comprises detecting whether one or more PDCP PDUs are missing from the one or more PDCP PDUs received from the second network node, declaring one or more missing PDCP PDUs as lost, and memorizing the internode interface specific sequence number of the one or more PDCP PDUs declared as a lost PDCP PDU. The detected one or more missing PDCP PDUs may be declared as lost after a threshold time. The method may further comprise removing the reported internode interface specific sequence numbers from the list of internode interface specific sequence numbers of PDCP PDUs declared as being lost at the network node after reporting feedback to the second network node. In certain embodiments, the desired additional amount of data in bytes may be based at least in part on an average data rate on a radio interface and an estimated round trip time on the internode interface.

Also disclosed is a network node. The network node comprises one or more processors. The one or more processors are configured to receive, from a second network node, one or more packet data convergence protocol (PDCP) packet data units (PDUs) on an internode interface, each of the one or more PDCP PDUs having an associated PDCP sequence number and an associated internode interface specific sequence number, the internode interface specific sequence numbers assigned by the second network node. The one or more processors are configured to transmit one or more of the received one or more PDCP PDUs to a user equipment. The one or more processors are configured to report feedback to the second network node, the feedback reported to the second network node comprising: a highest PDCP sequence number of a PDCP PDU that was successfully delivered in sequence to the user equipment among the one or more PDCP PDUs received from the second network node; a desired additional amount of data in bytes, the desired additional amount of data in bytes counted from the highest PDCP sequence number of the PDCP PDU that was successfully delivered in sequence to the user equipment; and a list of any internode interface specific sequence numbers of PDCP PDUs declared as being lost at the network node and not yet reported to the second network node as being lost.

Certain embodiments of the present disclosure may provide one or more technical advantages. For example, in certain embodiments feedback for a PDCP transmitter in a MeNB and flow control in general may be organized in an efficient way, such that the required overhead may be minimized, especially when no losses are expected on the internode interface between MeNB and SeNB. As another example, certain embodiments may ensure that the MeNB is able to determine that not more than half the sequence number space is brought in flight to avoid problems such as HFN de-synch in the UE PDCP receiver. As yet another example, certain embodiments may provide the means in the MeNB to utilize the provided data rates from MeNB to UE and from SeNB to UE to the maximum extent, optimizing the overall throughput for the UE. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, dual connectivity is a feature that allows a UE to simultaneously receive and transmit to at least two different network points, commonly referred to as MeNB and SeNB. Feedback between the MeNB and the SeNB may be required for the split bearer operation in dual connectivity to balance the dataflow between MeNB and SeNB. Feedback may also be required for the PDCP transmitting entity in the MeNB from SeNB to MeNB to make sure that for split bearers, the MeNB does not bring more than half of the PDCP sequence number space in flight. The present disclosure contemplates various embodiments that may provide an efficient feedback mechanism that fulfills these requirements.

Figure 1:
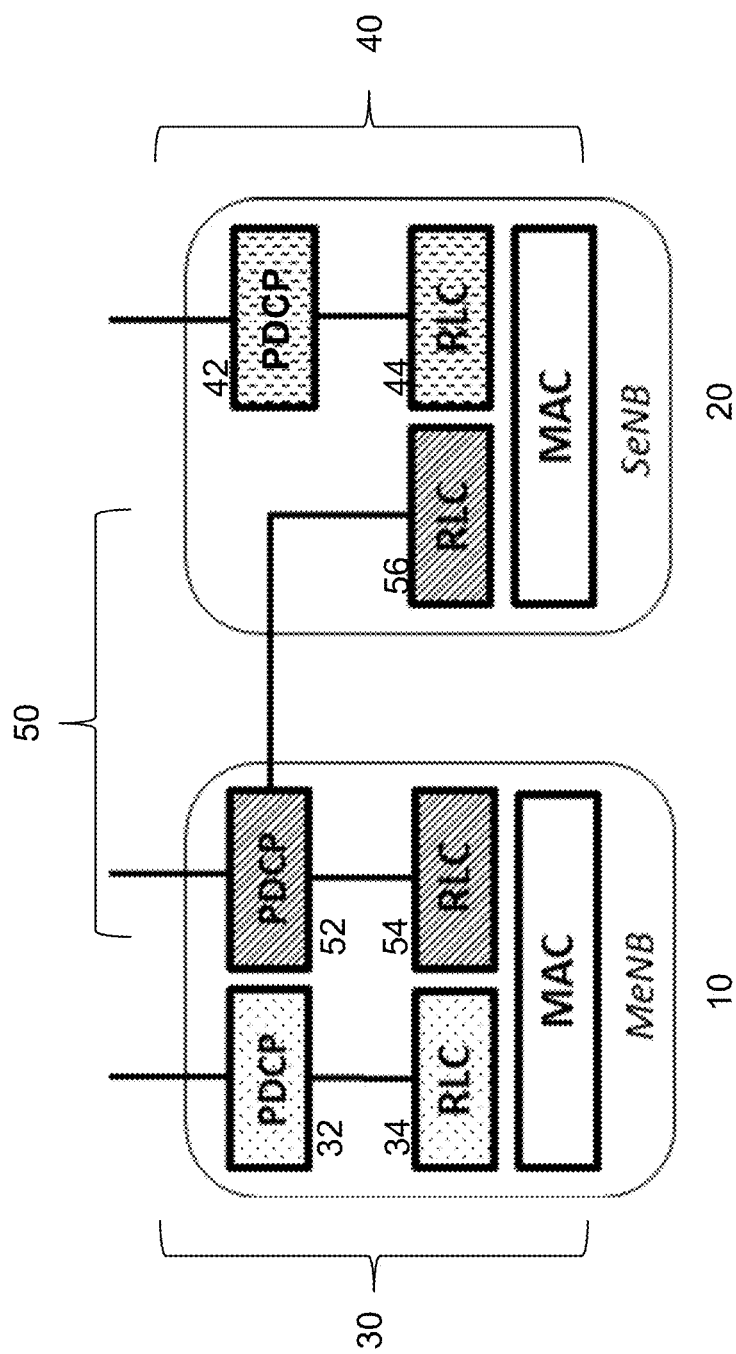
FIG. 1 is a block diagram of a protocol architecture in dual connectivity.
Figure 2:
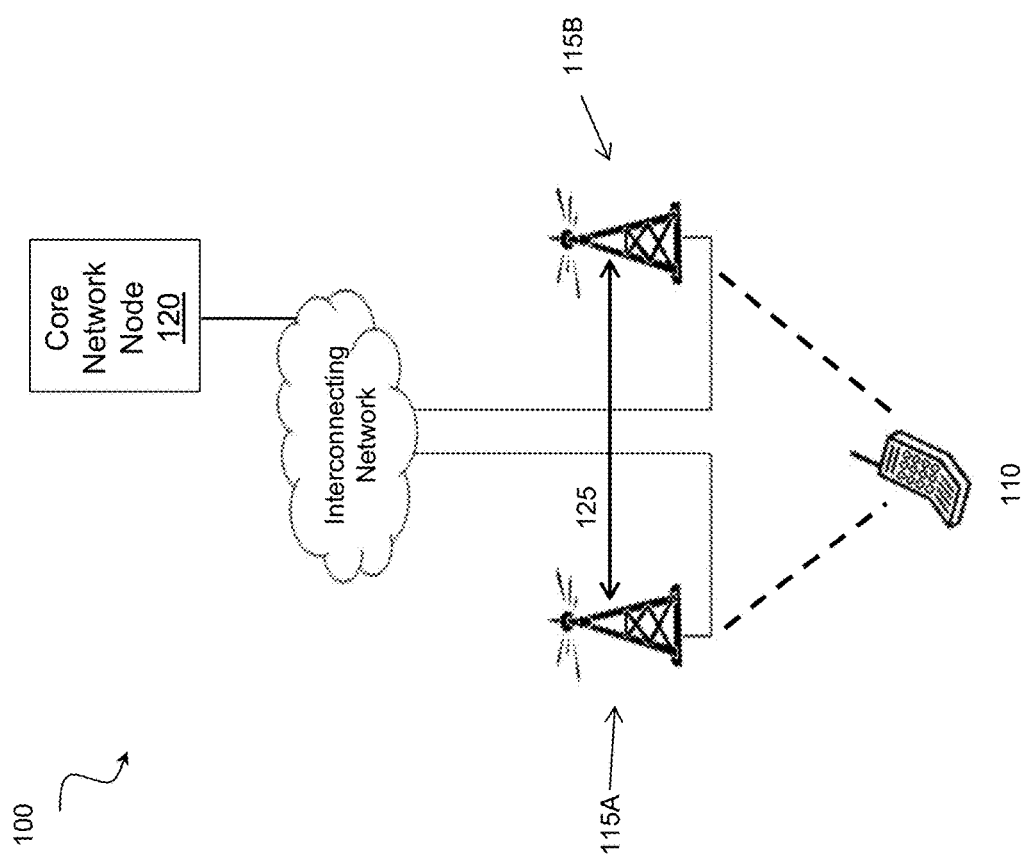
FIG. 2 is a block diagram illustrating an embodiment of a network, in accordance with certain embodiments.

FIG. 2 is a block diagram illustrating an embodiment of a network 100, in accordance with certain embodiments. Network 100 includes one or more wireless device(s) 110 (which may be interchangeably referred to as UEs 110), radio network node(s) 115 (which may be interchangeably referred to as eNBs 115), and core network node(s) 120. A wireless device 110 may communicate with a radio network node 115 over a wireless interface. For example, wireless device 110 may transmit wireless signals to one or more of radio network nodes 115A and 115B, and/or receive wireless signals from one or more of radio network nodes 115A and 115B. The wireless signals may contain voice traffic, data traffic, control signals, and/or any other suitable information. In some embodiments, an area of wireless signal coverage associated with a radio network node 115 may be referred to as a cell. In some embodiments, wireless device 110 may have dual connectivity capability. Thus, wireless device 110 may be able to receive signals from and/or transmit signals to at least two different network points simultaneously. For example, wireless device 110 may be able to receive signals from and/or transmit signals to radio network nodes 115A and 115B simultaneously.

Radio network nodes 115 may interface with core network node 120. In certain embodiments, radio network nodes 115 may interface with core network node 120 via an interconnecting network. The interconnecting network may refer to any interconnecting system capable of transmitting audio, video, signals, data, messages, or any combination of the preceding. In certain embodiments, radio network nodes 115A and 115B may interface with one or more radio network nodes over an internode interface 125. For example, network nodes 115A and 115B may interface over an X2 interface.

In some embodiments, core network node 120 may manage the establishment of communication sessions and various other functionality for wireless device 110. Wireless device 110 may exchange certain signals with core network node 120 using the non-access stratum layer. In non-access stratum signaling, signals between wireless device 110 and core network node 120 may be transparently passed through the radio access network. Example embodiments of wireless device 110, radio network node 115, and other network nodes (such as a radio network controller or core network node 120) are described with respect to FIGS. 7, 8, and 9, respectively.

With dual connectivity UE 110 may simultaneously receive and transmit to at least two different network points. As described above, the two different network points are usually denoted as MeNB and SeNB. In certain embodiments, radio network node 115A may be an MeNB, and radio network node 115B may be an SeNB. In such a case, radio network node 115A, as a MeNB, serves a master cell group (MCG), and SeNB 115B serves a secondary cell group (SCG). In certain embodiments, the RRC protocol, which is responsible for configuring UE 110, is terminated within MeNB 115A. While UE 110 receives RRC control signaling via the MCG, it may receive user data via both MCG and SCG.

In operation, MeNB 115A may receive user data for UE 110. In other words, MeNB 115A may receive one or more PDCP PDUs to send to UE 110. MeNB 115A may communicate one or more PDCP PDUs to UE 110, and may send one or more PDCP PDUs to SeNB 115B so that SeNB 115B can transmit them to UE 110. The PDCP PDUs sent to SeNB 115B may have both PDCP sequence numbers (SNs) and internode interface specific SNs. The internode interface specific SNs may be consecutive, and the PDCP SNs may not be consecutive from the perspective of SeNB 115B. SeNB 115B may report feedback to MeNB 115A. MeNB 115A may perform one or more operations based on the received feedback.

As described above, flow control feedback between MeNB 115A and SeNB 115B may be required for the split bearer operation in dual connectivity to balance the dataflow between MeNB 115A and SeNB 115B. Furthermore, feedback for the PDCP transmitter from SeNB 115B to MeNB 115A may be necessary to make sure that for split bearers, MeNB 115A does not bring more than half of the sequence number space in flight in order to avoid HFN de-sync (as in legacy behavior). This applies to both possible options for the PDCP reordering behavior (pull-based and push-based window solutions). In addition, the feedback signaling can also be used to control the buffer of MeNB 115A so that acknowledged PDUs can be removed and unnecessary retransmissions after handover, bearer- or SeNB removal can be avoided.

In certain embodiments, the feedback may be reported in any suitable manner. For example, the proposed feedback mechanism may involve the use of internode interface 125 between MeNB 115A and SeNB 115B. The present disclosure contemplates that any suitable internode interface 125 may be used for the proposed feedback mechanism. As one example, internode interface 125 could be an LTE X2 interface.

SeNB 115B may report any suitable information as feedback to MeNB 115A. For example, in certain embodiments, as feedback from SeNB 115B to MeNB 115A for a split bearer, SeNB 115B may provide a highest successfully delivered PDCP PDU sequence number by SeNB RLC; a list of unsuccessfully delivered PDUs on internode interface 125 based on internode interface specific sequence numbers (e.g., as a list of sequence numbers); and a desired amount of additional bytes by SeNB 115B as an offset of bytes to the highest successfully delivered PDCP PDU sequence number.

Based on this feedback, and by taking into account feedback of successfully delivered PDCP PDUs from MeNB RLC, MeNB 115A may ensure not more than half of the PDCP SN space is put in flight to UE 110. In certain embodiments, this may be done by determining, based on the overall feedback, a reception window and reordering timer state in the PDCP receiver of UE 110. Observing the requirement of not putting more than half the PDCP sequence number space in flight, MeNB 115A may maximize the throughput via SeNB 115B, taking into consideration its desired amount of data.

As described above, as part of the feedback reported to MeNB 115A by SeNB 115B, SeNB 115B may report PDCP PDUs successfully delivered to UE 110. The PDCP PDUs may have PDCP SNs. The PDCP SNs may not be consecutive from the perspective of SeNB 115B. SeNB 115B may report the highest PDCP SN of the PDUs that were successfully delivered by RLC in SeNB 115B to UE 110 since the last feedback instance. Note that indication of the single highest successfully in order delivered PDCP PDU alone may not be sufficient as feedback, since it would not consider potential losses or out of order deliveries on internode interface 125, such as an X2 interface.

In addition to reporting the highest successfully in order delivered PDCP PDU SN, feedback from SeNB 115B to MeNB 115A may include a list of PDUs not at all received at SeNB 115B. It is important that MeNB 115A is aware of internode interface deficiencies (e.g., X2 deficiencies) so that it never underestimates the data in flight (i.e., never sends more than half the PDCP SN space in flight), to avoid HFN de-synchronisation. In certain embodiments, this is achieved by MeNB 115A assigning internode interface specific sequence numbers to each PDCP PDU sent via internode interface 125. In certain embodiments, internode interface 125 may be an X2 interface, and the internode specific sequence numbers may be X2 SNs. In certain embodiments, the internode interface specific SNs may be consecutive. Although certain embodiments may be described in terms of an X2 interface and X2 sequence numbers, the present disclosure contemplates that any suitable internode interface and any suitable internode interface specific SNs may be used. MeNB 115A may assign to each PDCP PDU sent via internode interface 125 an internode interface specific SN. For example, MeNB 115A may assign X2 SNs in order to allow SeNB 115B to detect losses on internode interface 125 (e.g., X2-U).

To illustrate, consider the following examples in which it is assumed that MeNB 115A sends PDCP PDUs with PDCP SNs #2 and #4 directly to UE 110 via the air-interface, and sends PDCP PDUs with PDCP SNs #1, #3, and #5 to SeNB 115B via X2. PDCP PDUs having PDCP SNs #1, #3, and #5 are mapped to X2 SNs #10, #11, and #12, respectively. Note that for purposes of these examples, the internode interface specific sequence numbers are consecutive, while the PDCP PDU sequence numbers may not be consecutive from the perspective of SeNB 115B.

As a first example, assume PDCP PDUs #1, #3, and #5 are received from MeNB 115A by SeNB 115B in-order. In such a case, SeNB 115B would be able to understand that the PDUs are received in order, and that no PDUs are missing based on the consecutive X2 SNs assigned to the transmitted PDCP PDUs by MeNB 115A. SeNB 115B transmits PDCP PDUs #1, #3 and #5 to UE 110. If SeNB 115B decides to provide feedback after successful delivery of PDCP PDU #5 to UE 110 via RLC, SeNB 115B would report PDCP SN #5 as the highest successfully in order delivered PDCP PDU SN to MeNB 115A, without reporting any lost PDU.

As a second example, assume only PDCP PDUs #1 and #5 received by SeNB 115B. In such a case, SeNB 115B would be able to detect that a PDCP PDU is missing based on the internode interface specific sequence numbers, and would memorize X2 SN #11 as a "lost" PDU. SeNB 115B then transmits PDCP PDUs #1 and #5 to UE 110. If SeNB 115B decides to provide feedback after successful delivery of PDCP PDU #5 via RLC to UE 110, SeNB 115B would report PDCP SN #5 as the highest successfully in order delivered PDCP PDU SN to MeNB 115A, and report X2 SN #11 as being a lost PDU. In response, MeNB 115A may increase the sending window from PDCP SN #3 onwards up to halve of the PDCP SN space only when opportune, i.e., when it can make sure that the receiving window at UE 110 wouldn't span over half of the PDCP SN space.

As a third example, assume only PDCP PDUs #1 and #3 are received by SeNB 115B. If no other PDCP PDU is received at SeNB 115B, SeNB 115B would not be able to report the loss of X2 SN #12. This is because SeNB 115B receives X2 sequence numbers #10 and #11, which are consecutive and therefore do not indicate to SeNB 115B that a PDU is missing (compare to example two described above, in which SeNB 115B receives PDUs having X2 SNs #10 and #12, but not #11, and thus can recognize the PDU having X2 SN #11 as a missing PDU). SeNB 115B may then transmit PDCP PDUs #1 and #3 to UE 110. If SeNB 115B decides to provide feedback after successful delivery of PDCP PDU #3 via RLC to UE 110, it would report PDCP SN #3 as the highest successfully in order delivered PDCP PDU SN to MeNB 115A, and not report any lost PDU. If PDCP PDU #4 sent by MeNB 115A was successfully delivered, this would be the lower window size for MeNB 115A.

As a fourth example, assume PDCP PDUs #1, #3, and #5 are received in-order, but SN #3 is discarded in SeNB 115B. This scenario is handled in the manner described above in the second example. MeNB 115A would not behave differently if #3 hasn't reached SeNB 115B at all or was discarded there.

As a fifth example, assume PDCP PDUs #1, #5, and #3 are received out-of-order at SeNB 115B. SeNB 115B could, as an implementation option, put PDUs #3 and #5 in order in the receiving buffer. In that case, SeNB 115B would behave as described above in the first example. Alternatively, SeNB 115B could simply discard PDU #3, and then behave as described above in the second example.

As described above, in all cases an explicit indication of successful delivery of PDUs by SeNB 115B may not be necessary. In case the delivery failure is due to failure on the radio interface, i.e., due to RLC, an eNB-based radio link failure (RLF) should be indicated instead (as in legacy behavior), which can be handled by SeNB modification or release request message. Detection of losses or out of order delivery on X2 by SeNB 115B would be possible by introducing an X2 SN.

As described above, SeNB 115B may also report a desired additional amount of data in bytes as part of the feedback reported to MeNB 115A. The present disclosure contemplates that the desired additional amount of data in bytes may be determined in any suitable manner. For example, in certain embodiments, the desired additional amount of data in bytes may be counted from the highest PDCP SN of the PDCP PDU that was successfully delivered in sequence to UE 110. In a window-based flow control mechanism based on current queue state in MeNB 115A together with the feedback about queue state in SeNB 115B, MeNB 115A may be able to adjust the transmission window, which considers both SeNB rate and X2 backhaul delay.

The present disclosure contemplates that MeNB 115A may use the reported feedback in any suitable manner. For example, in certain embodiments MeNB 115A may use the reported feedback to avoid HFN de-synch, while at the same time optimizing throughput. In order to avoid HFN de-synch (i.e., avoid bringing more than half the PDCP SN space in flight), the PDCP transmitter of MeNB 115A takes various feedback into account, such as the successfully delivered PDCP PDU SNs from MeNB 115A RLC to UE 110, notification of highest successfully delivered PDCP PDU SN from SeNB 115B RLC, and notification of lost PDCP PDUs on internode interface 125 or in SeNB 115B). In certain embodiments, this information may be deduced based on a mapping between X2 SN and PDCP SN from the feedback of missing X2 PDUs from SeNB 115B.

In certain embodiments, MeNB 115A may mimic the receiver behavior of UE 110. For example, MeNB 115A may maintain the PDCP receiver state variables and reordering timer of UE 110. If a pull-based reordering mechanism is used in the PDCP UE receiver, each newly successfully delivered PDCP PDU by MeNB 115A RLC to UE 110 or by SeNB 115B RLC to UE 110 pulls the reordering window of the PDCP entity in UE 110 upwards. PDUs which are still missing and fall outside of the pulled-up window may be forgotten, even if the reordering timer is still running for those PDUs. It is desirable to avoid this, since it leads to HFN de-synch. In certain embodiments, MeNB 115A keeps track of a delivery status of each PDCP PDU based on the feedback described above, as well as MeNB 115A RLC notifications. MeNB 115A estimates the starting and stopping of the reordering timer based on the feedback. For example, if it becomes obvious that one intermediate PDCP PDU has not been delivered successfully by any RLC entity, then MeNB 115A can start/stop its own timer based on that. Only if MeNB 115A's maintained reordering timer expires will it advance the transmission window, since it is sure that UE 110's reordering timer has expired as well. In certain embodiments, MeNB 115A may use different (e.g., shorter) timer expiry values than it configured UE 110 to use to take into account X2 backhaul delay, or for any other suitable reason.

If a pushed-based reordering mechanism is used in UE 110's PDCP receiver, each newly successfully delivered PDCP PDU by MeNB 115A RLC to UE 110 or by SeNB 115B RLC to UE 110 is discarded by the PDCP receiving entity in UE 110 if it falls outside the reordering window (i.e., if more than half the SN space had been brought in flight). This needs to be avoided. The pushed-based reordering window is moved upwards if PDCP delivers a PDU, which may also happen when the reordering timer expires. As described above for the pull based window, MeNB 115A may also maintain its own window states and reordering timer to mimic UE 110's receiver, and to deduce from that the actual state of UE 110's reception window and timer status.

Figure 3:
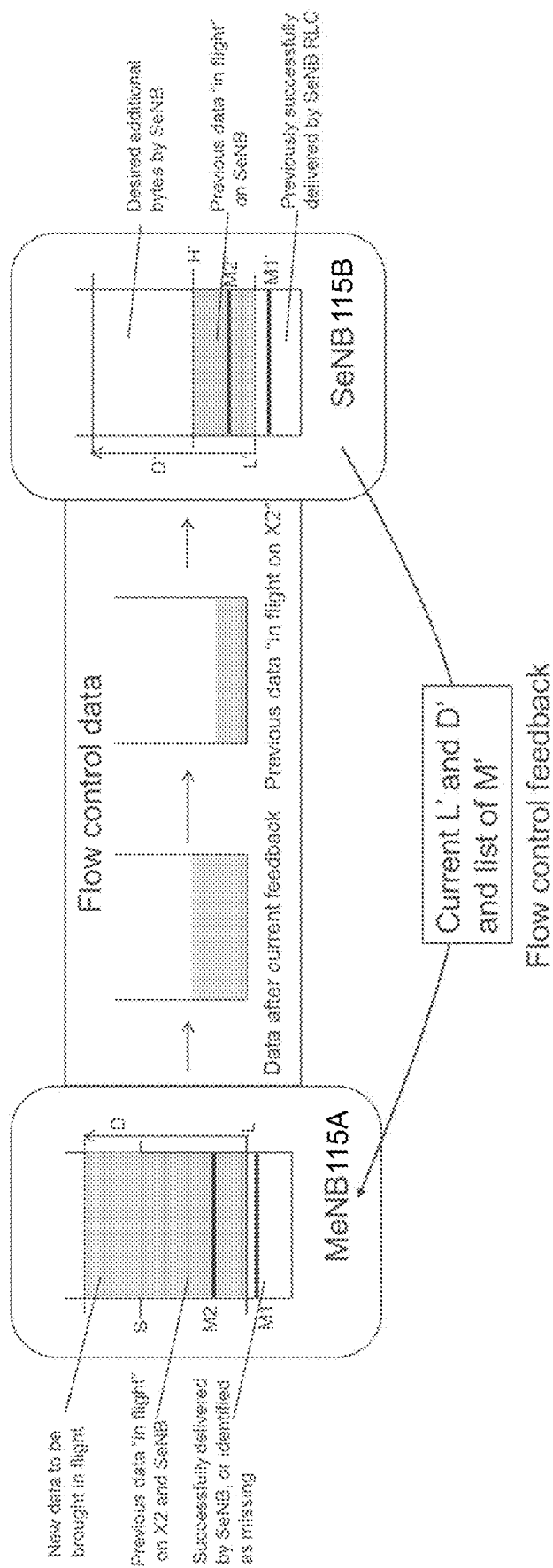
FIG. 3 illustrates an example PDCP and flow control feedback mechanism based on internode interface specific sequence numbers, in accordance with certain embodiments.

FIG. 3 illustrates an example PDCP and flow control feedback mechanism based on internode interface specific sequence numbers, in accordance with certain embodiments. The flow control entity in SeNB 115B keeps track of the following states: lower transmission window edge L', which is the highest successfully in order delivered PDCP PDU SN; higher transmission window edge H', which is the last data unit in the buffer; and desired further data estimate D', which corresponds to the desired additional bytes described above, and is a byte offset to L'. Thus, D' is relative from L'. SeNB 115B may determine D' itself (e.g., based on averaged data rate on the radio interface and estimated round trip time (RTT) on the internode interface, such as X2). M1' and M2' correspond to sample PDUs declared as being "lost" at SeNB 115B and reported to MeNB 115A.

Within the flow control feedback SeNB 115B informs MeNB 115A about the highest successfully in order delivered PDCP PDU SN (i.e., L') as well as the current value of D'. MeNB 115A also keeps track of those values, L and D, and further knows how many data units it had already sent (denoted as S in FIG. 3). Based on these values, MeNB 115A knows how much data is already "in flight" from its own point of view, which is data currently on the backhaul, as well as unacknowledged data in the buffer of SeNB 115B. Thus, MeNB 115A can determine how much more data needs to be brought "in flight" to satisfy the request of SeNB 115B. Since, as described above, MeNB 115A is also aware of data units lost on X2, it can take this information into account so that it does not bring more than half the PDCP SN space in flight to avoid HFN de-synch in the receiver.

The example flow control mechanism illustrated in FIG. 3 may require a suitable feedback periodicity. For example, in certain embodiments the feedback periodicity may be in the order of 10 ms, which can be regarded as minor additional signaling overhead in addition to the ongoing data transmission. This is especially so when considering the size of such feedback messages in relation to the sent payload data. In certain embodiments, if there is no data transmission, no feedback is required, such that no unnecessary overhead is generated. The values of L and L' may be given as absolute PDCP SNs. For simplicity reasons, D and D' may be given as an offset in bytes to the lower window edge L'.

Figure 4:
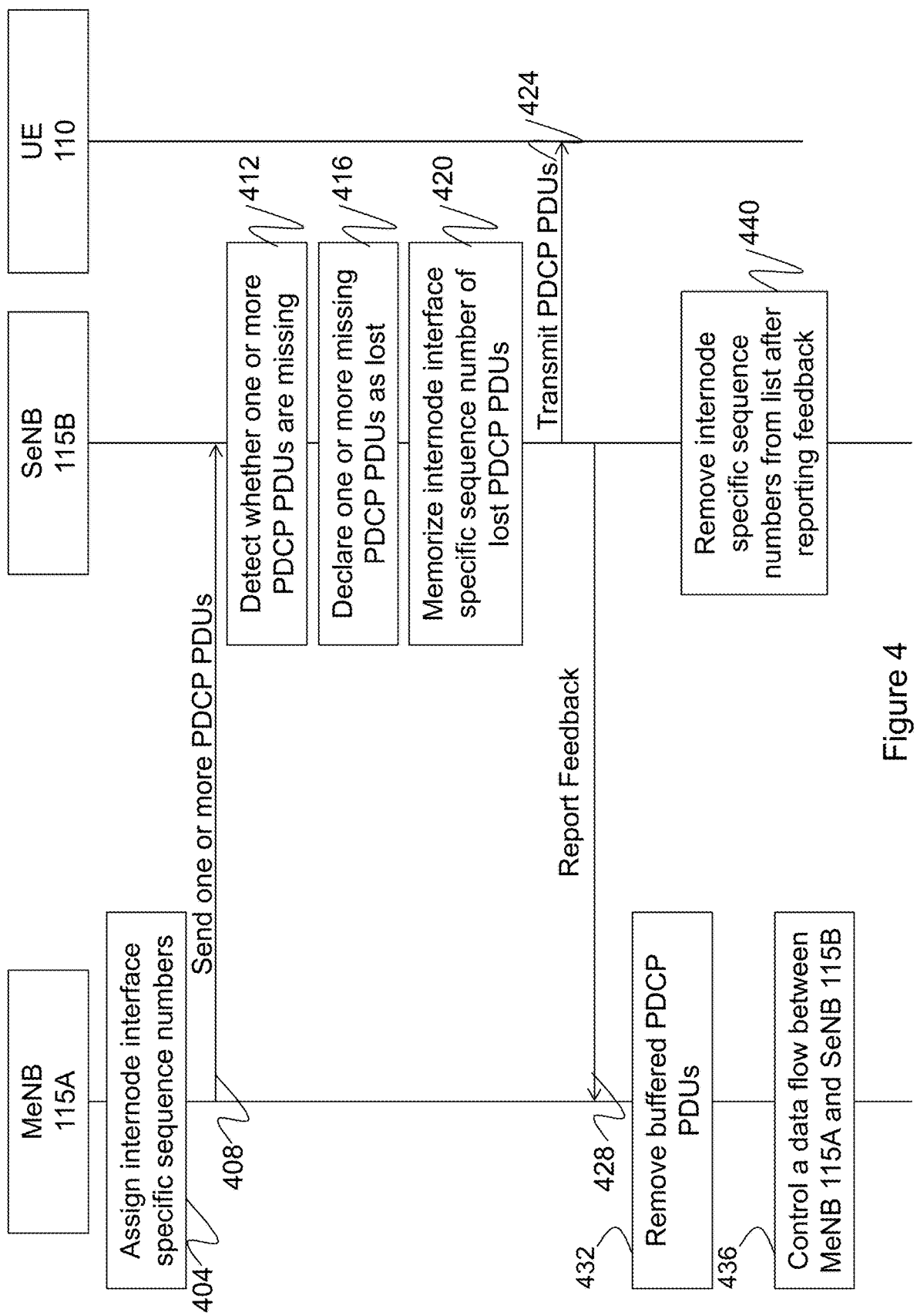
FIG. 4 is a signal flow diagram, in accordance with certain embodiments.

FIG. 4 is a signal flow diagram, in accordance with certain embodiments. At step 404, MeNB 115A assigns to each PDCP PDU to be sent over an internode interface an internode interface specific SN. The internode interface may be an X2-U interface, or any other suitable internode interface, and the internode interface specific sequence numbers may be consecutive. Each of the PDCP PDUs may also have a PDCP SN. The PDCP SNs may not be consecutive from the perspective of SeNB 115B. At step 408, MeNB 115A sends one or more PDCP PDUs to SeNB 115B. At step 412, SeNB 115B, upon receiving the one or more PDCP PDUs from MeNB 115A, detects whether one or more PDCP PDUs are missing. In certain embodiments, the missing PDCP PDUs may be lost during transmission via the internode interface. SeNB 115B may be able to detect a missing PDCP PDU based on the consecutive internode interface specific SNs assigned by MeNB 115A. At step 416, SeNB 115B declares the one or more PDCP PDUs detected as missing to be "lost." In certain embodiments, SeNB 115B may declare the one or more missing PDCP PDUs lost after a threshold time period. In certain embodiments, the threshold time period may be any suitable amount of time, and may be implementation specific. At step 420, SeNB 115B memorizes the respective internode interface specific sequence number of the lost PDCP PDUs (e.g., X2 SNs).

At step 424, SeNB 115B transmits the received one or more PDCP PDUs to UE 110. At step 428, SeNB 115B reports feedback to MeNB 115A. In certain embodiments, SeNB 115B may report feedback to MeNB 115A. As one example, in certain embodiments SeNB 115B may report feedback to MeNB 115A after any suitable time period (e.g., an implementation specific time). As another example, SeNB 115B may report feedback to MeNB 115A upon any suitable kind of trigger. The feedback reported by SeNB 115B to MeNB 115A may include any suitable information. For example, the feedback may include one or more of: the highest PDCP SN of that PDCP PDU that was successfully delivered in sequence towards UE 110 among those PDUs received by SeNB 115B, the desired additional bytes, counted from the PDCP PDU reported as the highest PDCP SN of the PDCP PDU successfully delivered in sequence towards UE 110; and a list of X2 SNs of those PDUs that were not at all delivered to SeNB 115B and not yet reported to MeNB 115A as being "lost."

MeNB 115A, upon receiving feedback from SeNB 115B, may perform any suitable operation using the received feedback. For example, at step 432 MeNB 115A may remove buffered PDCP PDUs according to the feedback of successfully delivered PDUs. At step 436, MeNB 115A may control a data flow between MeNB 115A and SeNB 115B. In certain embodiments, MeNB 115A may decide upon the actions necessary to take for PDUs reported as "lost" by SeNB 115B. At step 440, after being reported to MeNB 115A, SeNB 115B removes the respective X2 SN from its list of lost PDUs.

Figure 5:
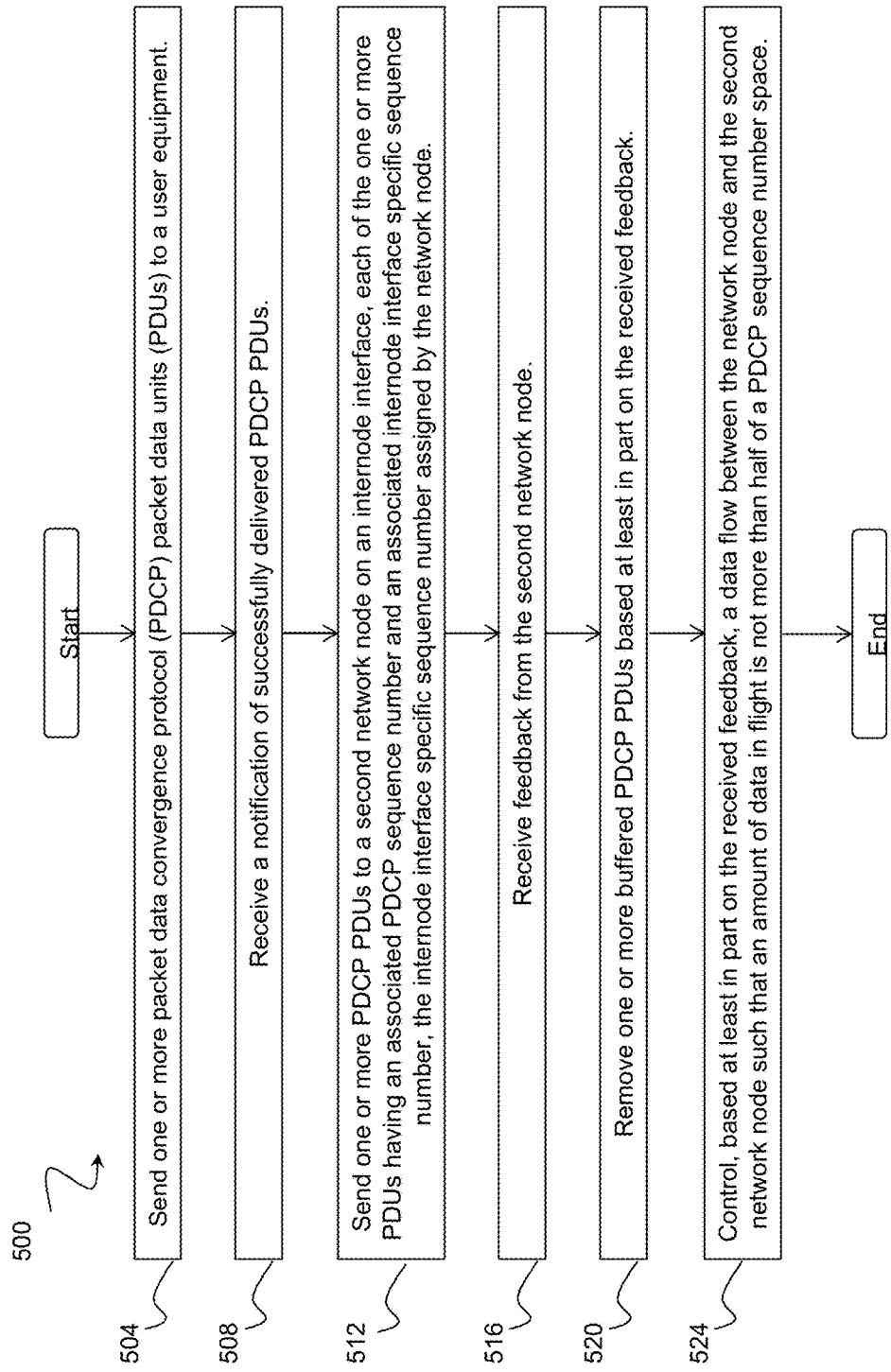
FIG. 5 is a flow diagram of a method in a network node, in accordance with an embodiment.

FIG. 5 is a flow diagram of a method in a network node, in accordance with an embodiment. The method begins at step 504, when the network node sends one or more PDCP PDUs to a user equipment. In certain embodiments, the network node may be an MeNB operating on a dual connectivity split bearer. At step 508, the network node receives a notification of successfully delivered PDCP PDUs.

At step 512, the network node sends one or more PDCP PDUs to a second network node on an internode interface, each of the one or more PDUs having an associated PDCP sequence number and an associated internode interface specific sequence number, the internode interface specific sequence numbers assigned by the network node. In certain embodiments, the second network node may be an SeNB operating on the dual connectivity split bearer, and the internode interface may be an X2 interface. The internode interface specific sequence numbers assigned by the network node may be consecutive. The PDCP sequence numbers may not be consecutive from the perspective of SeNB 115B.

At step 516, the network node receives feedback from the second network node. The received feedback may include any suitable information. For example, in certain embodiments the received feedback may include a highest PDCP sequence number of a PDCP PDU that was successfully delivered in sequence to a user equipment among the one or more PDCP PDUs sent to the second network node. The feedback may also include a desired additional amount of data in bytes, the desired additional amount of data in bytes counted from the highest PDCP sequence number of the PDCP PDU that was successfully delivered in sequence to the user equipment. The feedback may also include a list of any internode interface specific sequence numbers of PDCP PDUs sent to the second network node that were declared as being lost at the second network node and not yet reported to the network node as being lost.

At step 520, the network node removes one or more buffered PDCP PDUs based at least in part on the received feedback. At step 524, the network node controls, based at least in part on the received feedback, a data flow between the network node and the second network node such that an amount of data in flight is not more than half of a PDCP sequence number space. In certain embodiments, the amount of data in flight comprises an amount of data currently on the internode interface and an amount of unacknowledged data in a buffer of the second network node. In certain embodiments, the method may also include adjusting a transmission window based at least in part on the received feedback. The method may also include determining, based at least in part on the received feedback, whether a reordering timer in the user equipment is running, and advancing a PDCP transmission window beyond a lost PDCP PDU upon a determination that the reordering timer in the user equipment has expired.

Figure 6:
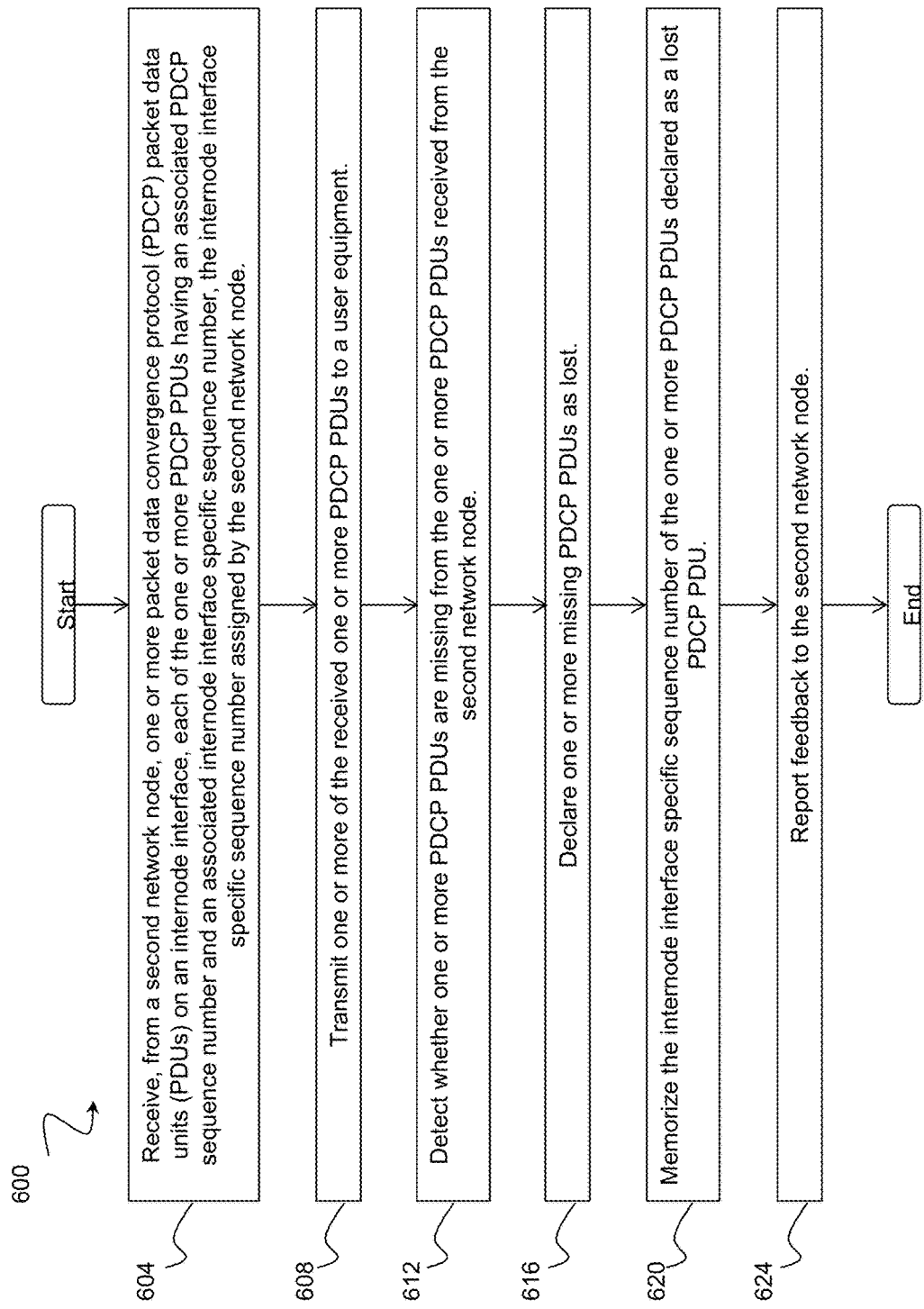
FIG. 6 is a flow diagram of a method in a network node, in accordance with an embodiment.

FIG. 6 is a flow diagram of a method in a network node, in accordance with an embodiment. The method begins at step 604, when the network node receives, from a second network node, one or more PDCP PDUs on an internode interface, each of the one or more PDCP PDUs having an associated PDCP sequence number and an associated internode interface specific sequence number, the internode interface specific sequence number assigned by the second network node. In certain embodiments, the network node may be an SeNB operating on a dual connectivity split bearer and the second network node may be an MeNB operating on the dual connectivity split bearer. The internode interface may be an X2 interface. The associated internode interface specific sequence numbers assigned by the second network node may be consecutive. The associated PDCP sequence numbers may not be consecutive from the perspective of SeNB 115B.

At step 608, the network node transmits one or more of the received one or more PDCP PDUs to a user equipment. In certain embodiments, the network node transmits one or more of the received one or more PDCP PDUs using radio link control. In certain embodiments, the network node may receive, from a radio link control in the network node, a notification of successfully delivered PDCP PDUs.

At step 612, the network node detects whether one or more PDCP PDUs are missing from the one or more PDCP PDUs received from the second network node. At step 616, the network node declares one or more missing PDCP PDUs as lost. In certain embodiments, the detected one or more missing PDCP PDUs may be declared as lost after a threshold time. At step 620, the network node memorizes the internode interface specific sequence number of the one or more PDCP PDUs declared as a lost PDCP PDU.

At step 624, the network node reports feedback to the second network node. The reported feedback may include any suitable information. For example, in certain embodiments, the reported feedback may include a highest PDCP sequence number of a PDCP PDU that was successfully delivered in sequence to the user equipment among the one or more PDCP PDUs received from the second network node. The reported feedback may also include a desired additional amount of data in bytes, the desired additional amount of data in bytes counted from the highest PDCP sequence number of the PDCP PDU that was successfully delivered in sequence to the user equipment. The reported feedback may also include a list of any internode interface specific sequence numbers of PDCP PDUs declared as being lost at the network node and not yet reported to the second network node as being lost.

In certain embodiments, the desired additional amount of data in bytes may be based at least in part on an average data rate on a radio interface and an estimated round trip time on the internode interface. The network node may remove the reported internode interface specific sequence numbers from the list of internode interface specific sequence numbers of PDCP PDUs declared as being lost at the network node after reporting feedback to the second network node.

Although the present embodiments may be described within the context of LTE (i.e., E-UTRAN), it should be understood that the problems and solutions described herein are equally applicable to wireless access networks and UEs implementing other access technologies and standards. LTE is used as a non-limiting example technology where the embodiments are suitable, and using LTE in the description therefore is particularly useful for understanding the problem and solutions solving the problem. Furthermore, it is to be understood that the various entities described herein, including but not limited to MeNB, SeNB, and UE, may be provided through the use of hardware (such as processors, memory, or circuit hardware) capable of executing software in the form of coded instructions stored on computer readable medium.

Figure 7:
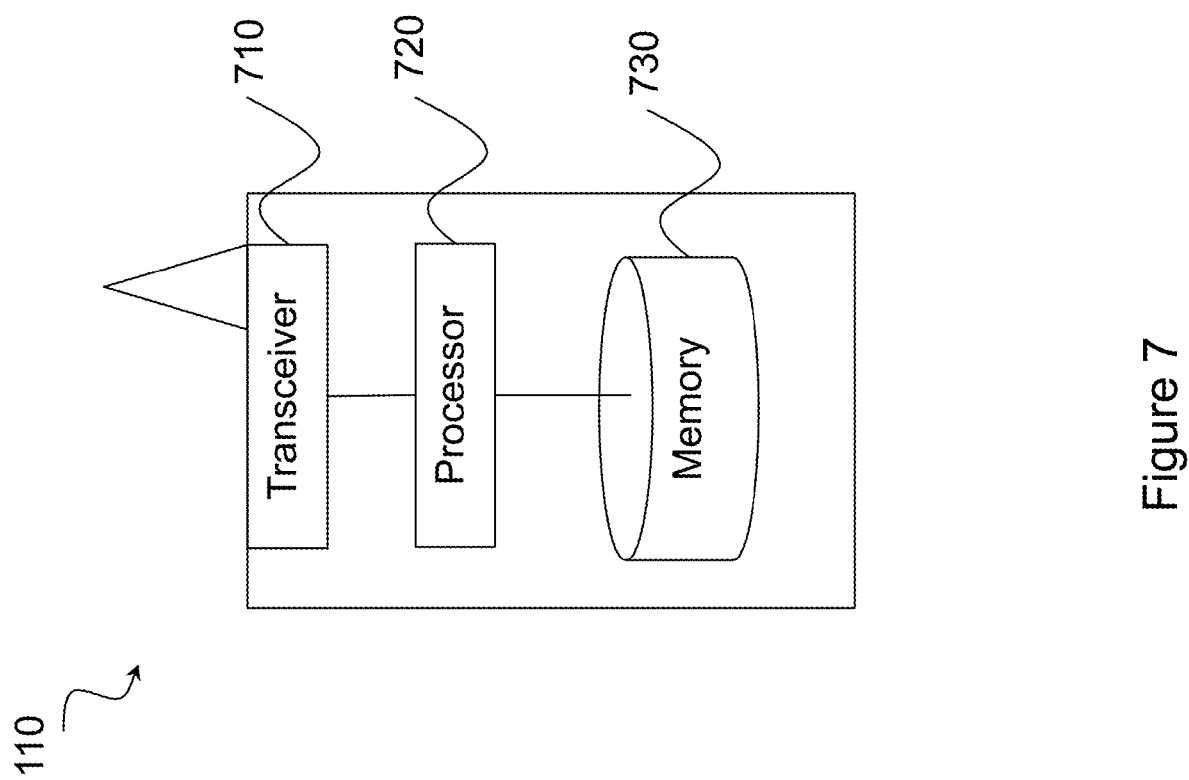
FIG. 7 is a block schematic of an exemplary wireless device, in accordance with certain embodiments.

FIG. 7 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. Wireless device 110 may have dual connectivity capability.

A wireless device 110 may also be referred to as a UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. The determining module may include or be included in processor 720. The determining module may include analog and/or digital circuitry configured to perform any of the functions of the determining module and/or processor 720. The functions of the determining module described above may, in certain embodiments, be performed in one or more distinct modules.

The communication module may perform the transmission functions of wireless device 110. The communication module may transmit messages to one or more of network nodes 115 of network 100. The communication module may include a transmitter and/or a transceiver, such as transceiver 710. The communication module may include circuitry configured to wirelessly transmit messages and/or signals. In particular embodiments, the communication module may receive messages and/or signals for transmission from the determining module. In certain embodiments, wireless device 110 may have dual connectivity capability and the communication module may be configured to transmit and/or receive messages and/or signals from two network nodes simultaneously.

The receiving module may perform the receiving functions of wireless device 110. For example, the receiving module may receive one or more PDCP PDUs from a network node. The receiving module may include a receiver and/or a transceiver. The receiving module may include circuitry configured to wirelessly receive messages and/or signals. In particular embodiments, the receiving module may communicate received messages and/or signals to the determining module. In certain embodiments, wireless device 110 may have dual connectivity capability and the receiver module may be configured to receive messages and/or signals from two network nodes simultaneously.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 8:
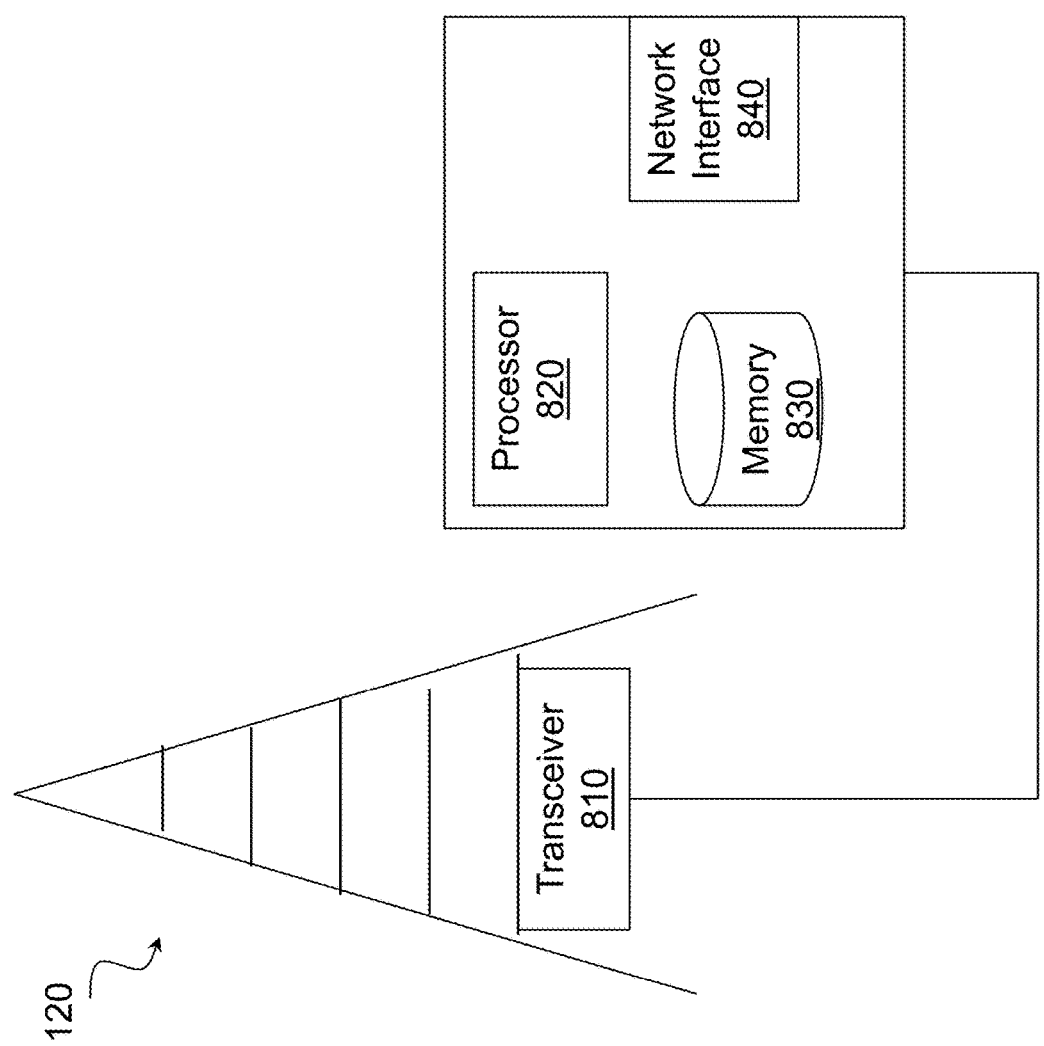
FIG. 8 is a block schematic of an exemplary radio network node, in accordance with certain embodiments.

FIG. 8 is a block schematic of an exemplary radio network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. In certain embodiments, network node 115 may be a master eNodeB or a secondary eNodeB operating on a dual connectivity split bearer.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes 120, radio network controllers, etc.

Processor 820 may include any suitable combination of hardware and software implemented in one or more modules to execute instructions and manipulate data to perform some or all of the described functions of network node 115. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 820 of FIG. 8.

In general, the communication module may perform the transmission functions of network node 115. The communication module may transmit messages to one or more of wireless devices 110. For example, in certain embodiments, network node 115 may be a master eNodeB, and the communication module may send one or more PDCP PDUs to a second network node 115, such as a secondary eNodeB, on an internode interface. The communication module may send one or more PDCP PDUs to a user equipment. As another example, in certain embodiments network node 115 may be a secondary eNodeB, and the communication module may report feedback to a second network node 115, such as a master eNodeB. The communication module may include a transmitter and/or a transceiver, such as transceiver 810. The communication module may include circuitry configured to wirelessly transmit messages and/or signals.

The receiving module may perform the receiving functions of network node 115. The receiving module may receive any suitable information from a wireless device 110 or from a network node 115. For example, in certain embodiments network node 115 may be a master eNodeB, and the receiving module may receive feedback from a second network node 115, such as a secondary eNodeB. The receiving module may receive, from a radio link control in the master eNodeB, a notification of successfully delivered PDCP PDUs. As another example, in certain embodiments network node 115 may be a secondary eNodeB, and the receiving module may receive, from a second network node 115 such as a master eNodeB, one or more PDCP PDUs on an internode interface. In certain embodiments, the communication module may receive, from a radio link control in the secondary eNodeB, a notification of successfully delivered PDCP PDUs. The receiving module may include a receiver and/or a transceiver. The receiving module may include circuitry configured to wirelessly receive messages and/or signals. In particular embodiments, the receiving module may communicate received messages and/or signals to the determining module.

The determining module may perform the processing functions of network node 115. For example, in certain embodiments network node 115 may be a master eNodeB, and the determining module may assign internode interface specific sequence numbers to the one or more PDCP PDUs sent to a second network node, such as a secondary eNodeB. As another example, the determining module may remove one or more buffered PDCP PDUs based at least in part on received feedback. As yet another example, the determining module may control a data flow between the master eNodeB and the secondary eNodeB such that an amount of data in flight is not more than half of a PDCP sequence number space. In certain embodiments, network node 115 may be a secondary eNodeB, and the determining module may determine: a highest PDCP sequence number of a PDCP PDU that was successfully delivered in sequence to a user equipment among the one or more PDCP PDUs received from the master eNodeB; a desired additional amount of data in bytes, the desired additional amount of data in bytes counted from the highest PDCP sequence number of the PDCP PDU that was successfully delivered in sequence to the user equipment; and a list of any internode interface specific sequence numbers of PDCP PDUs sent to the secondary eNodeB that were declared as being lost at the secondary eNodeB and not yet reported to a second network node, such as a master eNodeB, as being lost. As further examples, the determining module may detect whether one or more PDCP PDUs are missing from the one or more PDCP PDUs received from the master eNodeB, may declare one or more missing PDCP PDUs as lost, and may memorize the internode interface specific sequence numbers of the one or more PDCP PDUs declared as a lost PDCP PDU.

In certain embodiments, the functions of two or more of the various modules may be combined into a single module. The various modules may perform some, all, or none of the various functionalities described above, depending on the particular embodiment. Furthermore, in certain embodiments some of the functions described above as being performed by a particular module may be performed by another one of the described modules or by any other suitable module.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
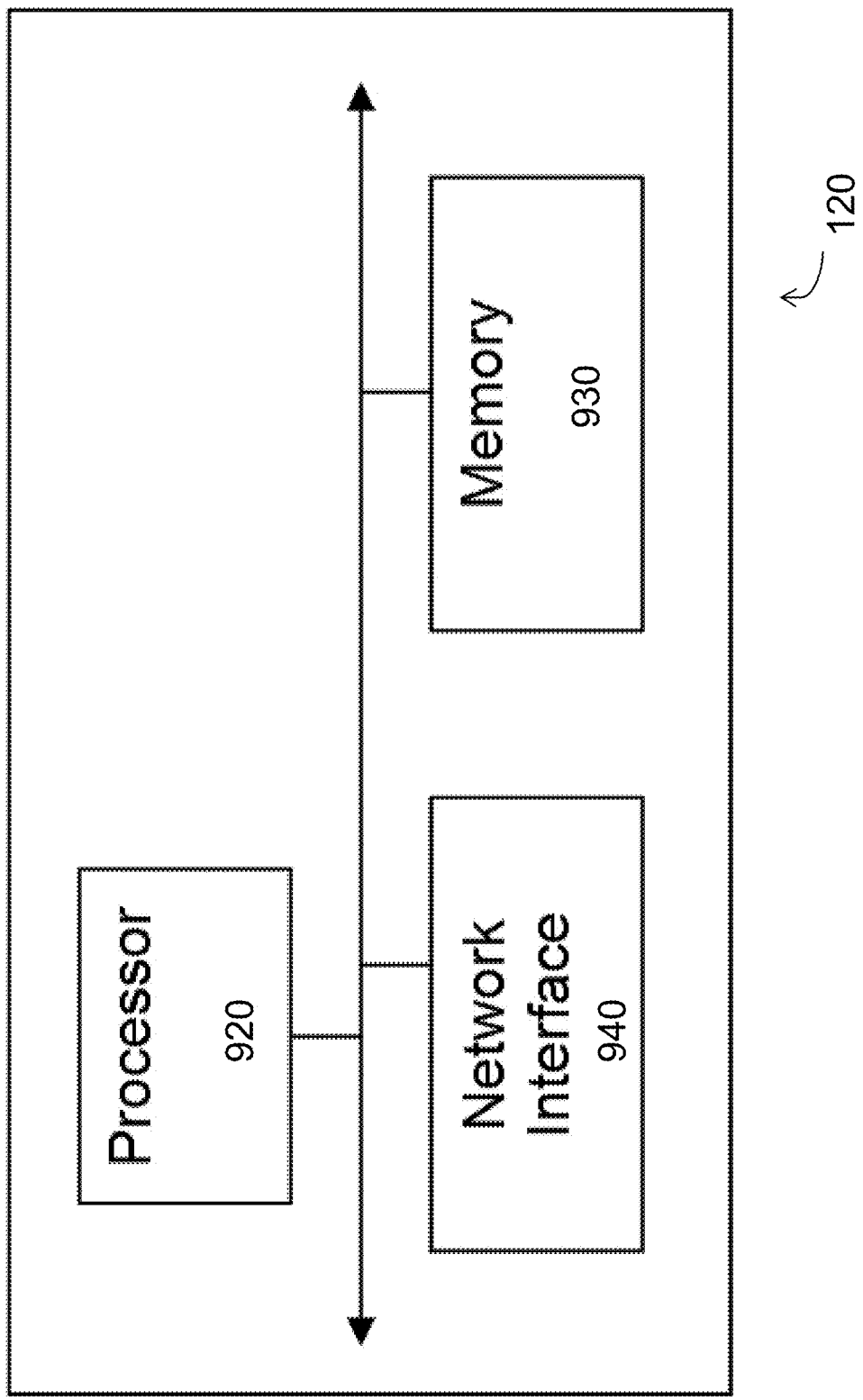
FIG. 9 is a block schematic of an exemplary core network node or radio network controller, in accordance with certain embodiments.

FIG. 9 is a block schematic of an exemplary core network node 120 or radio network controller, in accordance with certain embodiments. Examples of network nodes can include a mobile switching center (MSC), a serving GPRS support node (SGSN), a mobility management entity (MME), a radio network controller (RNC), a base station controller (BSC), and so on. The core network node 130 include processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers, core network nodes 120, etc.

Processor 920 may include any suitable combination of hardware and software implemented in one or more modules to execute instructions and manipulate data to perform some or all of the described functions of the radio network controller or core network node 120. In some embodiments, processor 1320 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
eNB eNodeB
HFN Hyper Frame Number
LTE Long Term Evolution
MeNB Master eNB
MCG Master cell group
PDCP Packet Data Convergence Protocol
PDU Packet Data Unit
RLC Radio Link Control
RLF Radio Link Failure
RRC Radio Resource Control
RTT Round Trip Time
SCG Secondary cell group
SeNB Secondary eNB
SN Sequence number
UE User Equipment

The invention claimed is:

1. A method in a network node, comprising:
sending one or more packet data convergence protocol (PDCP) packet data units (PDUs) to a second network node on an internode interface, each of the one or more PDUs having an associated PDCP sequence number and an associated internode interface specific sequence number, the internode interface specific sequence numbers assigned by the network node; and
receiving feedback from the second network node, the feedback from the second node comprising:
a highest PDCP sequence number of a PDCP PDU that was successfully delivered in sequence to a user equipment among the one or more PDCP PDUs sent to the second network node;
a desired additional amount of data in bytes, the desired additional amount of data in bytes counted from the highest PDCP sequence number of the PDCP PDU that was successfully delivered in sequence to the user equipment; and
a list of any internode interface specific sequence numbers of PDCP PDUs sent to the second network node that were declared as being lost at the second network node and not yet reported to the network node as being lost.

2. The method of claim 1, wherein:
the network node is a master eNodeB operating on a dual connectivity split bearer;
the second network node is a secondary eNodeB operating on the dual connectivity split bearer; and
the internode interface is a X2 interface.

3. The method of claim 1, wherein the internode interface specific sequence numbers assigned by the network node are consecutive.

4. The method of claim 1, further comprising:
sending one or more PDCP PDUs to the user equipment; and
receiving, from a radio link control in the network node, a notification of successfully delivered PDCP PDUs.

5. The method of claim 1, further comprising removing one or more buffered PDCP PDUs based at least in part on the received feedback.

6. The method of claim 1, further comprising controlling, based at least in part on the received feedback, a data flow between the network node and the second network node such that an amount of data in flight is not more than half of a PDCP sequence number space.

7. The method of claim 6, wherein the amount of data in flight comprises an amount of data currently on the internode interface and an amount of unacknowledged data in a buffer of the second network node.

8. The method of claim 1, further comprising adjusting a transmission window based at least in part on the received feedback.

9. The method of claim 1, further comprising:
determining, based at least in part on the received feedback, whether a reordering timer in the user equipment is running; and
advancing a PDCP transmission window beyond a lost PDCP PDU upon a determination that the reordering timer in the user equipment has expired.

10. A method in a network node, comprising:
receiving, from a second network node, one or more packet data convergence protocol (PDCP) packet data units (PDUs) on an internode interface, each of the one or more PDCP PDUs having an associated PDCP sequence number and an associated internode interface specific sequence number, the internode interface specific sequence numbers assigned by the second network node;
transmitting one or more of the received one or more PDCP PDUs to a user equipment; and
reporting feedback to the second network node, the feedback reported to the second network node comprising:
a highest PDCP sequence number of a PDCP PDU that was successfully delivered in sequence to the user equipment among the one or more PDCP PDUs received from the second network node;
a desired additional amount of data in bytes, the desired additional amount of data in bytes counted from the highest PDCP sequence number of the PDCP PDU that was successfully delivered in sequence to the user equipment; and
a list of any internode interface specific sequence numbers of PDCP PDUs declared as being lost at the network node and not yet reported to the second network node as being lost.

11. The method of claim 10, wherein:
the network node is a secondary eNodeB operating on a dual connectivity split bearer;
the second network node is a master eNodeB operating on the dual connectivity split bearer; and
the internode interface is an X2 interface.

12. The method of claim 10, wherein the internode interface specific sequence numbers assigned by the second network node are consecutive.

13. The method of claim 10, further comprising:
detecting whether one or more PDCP PDUs are missing from the one or more PDCP PDUs received from the second network node;
declaring one or more missing PDCP PDUs as lost; and
memorizing the internode interface specific sequence number of the one or more PDCP PDUs declared as a lost PDCP PDU.

14. The method of claim 13, wherein the detected one or more missing PDCP PDUs are declared as lost after a threshold time.

15. The method of claim 10, further comprising:
removing the reported internode interface specific sequence numbers from the list of internode interface specific sequence numbers of PDCP PDUs declared as being lost at the network node after reporting feedback to the second network node.

16. The method of claim 10, wherein the desired additional amount of data in bytes is based at least in part on an average data rate on a radio interface and an estimated round trip time on the internode interface.

17. A network node, comprising:
one or more processors configured to:
send one or more packet data convergence protocol (PDCP) packet data units (PDUs) to a second network node on an internode interface, each of the one or more PDUs having an associated PDCP sequence number and an associated internode interface specific sequence number, the internode interface specific sequence numbers assigned by the network node;
receive feedback from the second network node, the feedback from the second node comprising:
a highest PDCP sequence number of a PDCP PDU that was successfully delivered in sequence to a user equipment among the one or more PDCP PDUs sent to the second network node;
a desired additional amount of data in bytes, the desired additional amount of data in bytes counted from the highest PDCP sequence number of the PDCP PDU that was successfully delivered in sequence to the user equipment; and
a list of any internode interface specific sequence numbers of PDCP PDUs sent to the second network node that were declared as being lost at the second network node and not yet reported to the network node as being lost.

18. The network node of claim 17, wherein:
the network node is a master eNodeB operating on a dual connectivity split bearer;
the second network node is a secondary eNodeB operating on the dual connectivity split bearer; and
the internode interface is a X2 interface.

19. The network node of claim 17, wherein the internode interface specific sequence numbers assigned by the network node are consecutive.

20. The network node of claim 17, wherein the one or more processors are further configured to:
send one or more PDCP PDUs to the user equipment; and
receive, from a radio link control in the network node, a notification of successfully delivered PDCP PDUs.

21. The network node of claim 17, wherein the one or more processors are further configured to remove one or more buffered PDCP PDUs based at least in part on the received feedback.

22. The network node of claim 17, wherein the one or more processors are further configured to control, based at least in part on the received feedback, a data flow between the network node and the second network node such that an amount of data in flight is not more than half of a PDCP sequence number space.

23. The network node of claim 22, wherein the amount of data in flight comprises an amount of data currently on the internode interface and an amount of unacknowledged data in a buffer of the second network node.

24. The network node of claim 17, wherein the one or more processors are further configured to adjust a transmission window based at least in part on the received feedback.

25. The network node of claim 17, wherein the one or more processors are further configured to:
determine, based at least in part on the received feedback, whether a reordering timer in the user equipment is running; and
advance a PDCP transmission window beyond a lost PDCP PDU upon a determination that the reordering timer in the user equipment has expired.

26. A network node, comprising:
one or more processors configured to:
receive, from a second network node, one or more packet data convergence protocol (PDCP) packet data units (PDUs) on an internode interface, each of the one or more PDCP PDUs having an associated PDCP sequence number and an associated internode interface specific sequence number, the internode interface specific sequence numbers assigned by the second network node;
transmit one or more of the received one or more PDCP PDUs to a user equipment; and
report feedback to the second network node, the feedback reported to the second network node comprising:
a highest PDCP sequence number of a PDCP PDU that was successfully delivered in sequence to the user equipment among the one or more PDCP PDUs received from the second network node;
a desired additional amount of data in bytes, the desired additional amount of data in bytes counted from the highest PDCP sequence number of the PDCP PDU that was successfully delivered in sequence to the user equipment; and
a list of any internode interface specific sequence numbers of PDCP PDUs declared as being lost at the network node and not yet reported to the second network node as being lost.

27. The network node of claim 26, wherein:
the network node is a secondary eNodeB operating on a dual connectivity split bearer; the second network node is a master eNodeB operating on the dual connectivity split bearer; and
the internode interface is an X2 interface.

28. The network node of claim 26, wherein the internode interface specific sequence numbers assigned by the second network node are consecutive.

29. The network node of claim 26, wherein the one or more processors are further configured to:
detect whether one or more PDCP PDUs are missing from the one or more PDCP PDUs received from the second network node;
declare one or more missing PDCP PDUs as lost; and
memorize the internode interface specific sequence number of the one or more PDCP PDUs declared as a lost PDCP PDU.

30. The network node of claim 29, wherein the detected one or more missing PDCP PDUs are declared as lost after a threshold time.

31. The network node of claim 26, wherein the one or more processors are further configured to remove the reported internode interface specific sequence numbers from the list of internode interface specific sequence numbers of PDCP PDUs declared as being lost at the network node after reporting feedback to the second network node.

32. The network node of claim 26, wherein the desired additional amount of data in bytes is based at least in part on an average data rate on a radio interface and an estimated round trip time on the internode interface.

* * * * *